July 14, 1959  R. K. BROWN  2,894,595
MEASUREMENT OF THE VELOCITY OF SOUND IN FLUIDS
Filed June 24, 1953
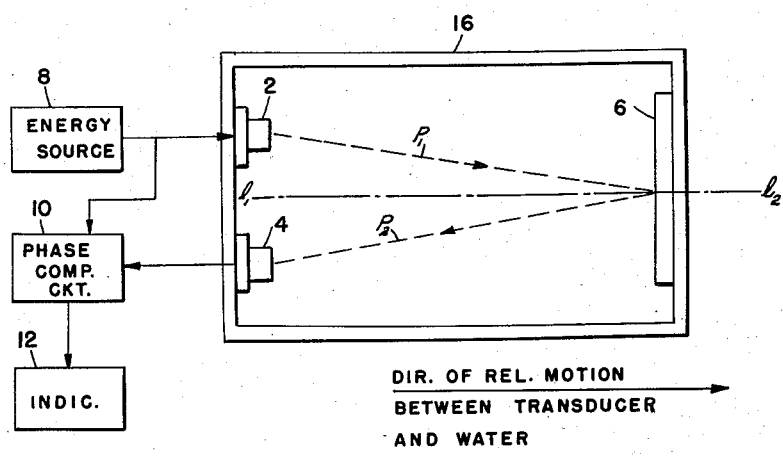
INVENTOR:
RICHARD K. BROWN
BY
ATT'YS

United States Patent Office 2,894,595
Patented July 14, 1959

2,894,595

MEASUREMENT OF THE VELOCITY OF SOUND IN FLUIDS

Richard K. Brown, Ann Arbor, Mich., assignor, by mesne assignments, to the United States of America as represented by the Secretary of the Navy Application June 24, 1953, Serial No. 363,892

3 Claims. (Cl. 181—.5)

This invention relates to sound velocity measuring devices; more particularly, the invention relates to a device for measuring the velocity of sound in a moving fluid utilizing the principle of phase comparison between the transmitted and received sound waves.

The velocity of sound in the ocean depends upon the temperature, the pressure, and the amount of dissolved salt in the water. These three velocity-influencing factors are not constant. All three may change with depth, and temperature and salinity may change from point to point in a horizontal plane.

The development of echo-ranging equipment, spurred by the tremendous effectiveness of the submarine in the first and second world wars, has increased greatly the importance of knowing the velocity of underwater sound accurately. Sound waves in general follow the well-known laws of optics. When a sound wave passes from one medium into a second medium in which the wave has a lower sound velocity, the wave in the second medium is deviated toward the normal. With a velocity structure unfavorable for echo ranging, the presence of an approaching submarine may not be detected until it has come much closer than the maximum range of the sonic detection equipment under good sound conditions. A knowledge of the velocity of sound at various depths will permit the detecting ship to predict its maximum range of detection, or, conversely, will tell a submarine how best to operate so as to avoid being detected.

In the prior art, a sound velocity meter based on the principle of comparing the phase between the transmitted and received sound signal has been used. For example, see U.S. Patent 2,480,646 granted August 30, 1949 to W. C. Grabau.

Although this principle, prior to the present invention, has not been applied to the measurement of sound velocity in sea water, the principle of this comparison device is applicable to such a use if additional improvements are made over these existing devices. One serious problem encountered in connection with measuring the velocity of sound in fluid mediums which have appreciable motion is that the sound velocity indicated by a meter of the Grabau type is influenced to a certain extent by a flow of water around the sound transmitting or transducer units. When a sound velocity meter is towed by a ship, it has been observed that rolling of the ship and the motion of the meter through the water have introduced errors which, for certain applications, would make the apparatus ineffectual for its intended purpose. In the case where a velocity meter is towed by a ship, the relative motion between the velocity meter and the water is in general in a horizontal plane.

Accordingly, one object of the invention is to provide an improved sound velocity meter for use in fluids where there is relative motion between the velocity-measuring device and the fluid in which it is located.

A further object of the invention is to provide a novel and improved sound velocity meter for use in measuring sound velocities in sea water where the meter is to be towed by a ship or otherwise to be moved relative to the water in which it is placed.

A still further object of the invention is to provide a sound velocity meter of the phase comparison type which eliminates errors in velocity indication due to relative motion between the fluid medium in which it is placed and the velocity meter.

A feature of the invention is to place a sound-transmitting transducer adapted to direct sound energy in a given direction beside a sound-receiving transducer arranged to be sensitive to sound waves arriving from a general direction opposite to the direction of sound transmission by said sound-transmitting transducer. A reflecting surface is placed equidistant from and opposite the transmitting and receiving transducers, so that a sound wave from the transmitting transducer will be reflected to the receiving transducer. When the device is immersed in a fluid and there is no relative motion, the incident and reflected paths are of equal length. However, when there is relative motion in a direction substantially parallel to the line bisecting the angle of convergence of the aforesaid paths, the relative motion brings about a shortening of one of the wave paths and to substantially the same extent a lengthening of the other wave path, so that the distance traveled by the wave from the transmitting transducer to the reflector to the receiving transducer is unaffected by the relative motion.

Other objects and features of the invention will become more apparent upon making reference to the specification, claims, and drawing which shows a simplified block diagram of the system making up the invention.

Referring now to the drawing, a transmitting transducer 2 facing in a direction to direct energy along a path $P_1$ is mounted beside a receiving transducer 4 which is sensitive to sound arriving in the general direction of path $P_2$. A sound reflecting surface 6 is placed opposite the two transducers just described, so that sound waves arriving from transducer 2 along path $P_1$ will be reflected to the receiving transducer 4 along path $P_2$. If the paths $P_1$ and $P_2$ are at slight angles symmetrical with respect to a line $l_1$—$l_2$ passing through the point of reflection of the sound waves on said reflection surface 6 and parallel to the direction of relative motion between the transducers 2 and 4 and the fluid medium in which the transducers are placed, any errors due to this relative motion will be cancelled in a sound velocity determining device based on the phase comparison principle.

Transducers 2 and 4 may be of any suitable, well-known type of sound-transmitting and receiving transducer devices, such as magnetostrictive or crystal devices well known to the art, which convert electrical energy to sound energy or sound energy to electrical energy. Accordingly, a suitable sinusoidal energy source 8 such as an electrical oscillator circuit is coupled to the transducer 2. Coupled to the output of receiving transducer 4 are suitable electrical amplifier circuits of well-known variety (not shown) which include a phase comparison circuit 10 of conventional variety which compares the phase of the energy transmitted by the transmitting transducer 2 and that received by receiving transducer 4. As the velocity of sound in the fluid medium in which the apparatus is placed varies, the relative phase between the input and the output signals of transducers 2 and 4 will vary accordingly. An indicating device 12 is coupled to the phase comparison circuit indicating in visual or other form the velocity measured.

Since the transducers 2 and 4 and the reflecting surface 6, which may be a plane surface facing the transducers, must be maintained in fixed interrelation, these units are mounted on a common frame 16.

As previously stated, the phase comparison principle is not itself novel for measuring the velocity of a fluid medium, and, accordingly, the conventional parts of the system are shown only in block form. Further description of the system is felt unnecessary under the circumstances.

This invention in a simple and economical manner has provided an arrangement whereby velocity of sound in a fluid medium, notwithstanding relative motion between the measuring device and the medium in which it is immersed, may be accurately measured by the phase comparison principle.

I claim:

1. In a method of determining the velocity of sound in a liquid medium from a body moving through the medium, the steps of arranging a reflector equidistant and at a known fixed distance from a pair of transducers, exciting one of the transducers with an electric signal, moving the body in a liquid medium in a direction substantially parallel to a line bisecting the angle between the sound beam from the excited transducer to the reflector and the sound beam reflected to the other transducer, and detecting the phase difference between the exciting signal and the signal emitted by said other transducer.

2. In a method of determining the velocity of sound in a liquid medium from a body moving through the medium, the steps of transmitting a continuous carrier wave signal, converting the signal to a sound beam in the medium, reflecting the beam in the medium, converting the reflected beam to an electric signal, directing the beams in directions such that the angle between them is susbtantially bisected by a line parallel to the direction of relative motion of the medium and the body, and detecting the phase difference between the two signals.

3. In a method of determining the velocity of sound in a liquid medium from a body moving through the medium, the steps of transmitting a continuous carrier wave signal, converting the signal to a sound beam in the medium, reflecting the beam in the medium, converting the reflected beam to an electric signal, directing the beams in directions such that the angle between them is substantially bisected by a line parallel to the direction of relative notion of the medium and the body, detecting the phase difference between the two signals, and indicating substantially the absolute sound velocity.

References Cited in the file of this patent

UNITED STATES PATENTS

| | | |
|---|---|---|
| 1,864,638 | Chilowsky | June 28, 1932 |
| 2,418,538 | Yetter | Apr. 8, 1947 |
| 2,480,646 | Grabau | Aug. 30, 1949 |
| 2,618,968 | McConnell | Nov. 25, 1952 |
| 2,672,590 | McSkimin | Mar. 16, 1954 |
| 2,733,597 | Hardy | Feb. 7, 1956 |
| 2,756,404 | Anderson et al. | July 24, 1956 |

OTHER REFERENCES

MPublication-Journal of Applied Physics, vol. 22, No. 12, Dec. 1951, pp. 1407–1413, article by G. Holton (a photostat copy in Div. 36.)